(12) United States Patent
Williams et al.

(10) Patent No.: US 7,463,378 B2
(45) Date of Patent: Dec. 9, 2008

(54) VISITOR SAFE WIRELESS PRINTER ACCESS POINT

(75) Inventors: Brett J. Williams, Roseville, CA (US); Duane E. Mentze, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1142 days.

(21) Appl. No.: 10/646,285

(22) Filed: Aug. 21, 2003

(65) Prior Publication Data

US 2005/0044479 A1 Feb. 24, 2005

(51) Int. Cl.
*G06F 15/00* (2006.01)
*G06K 1/00* (2006.01)

(52) U.S. Cl. ............... 358/1.15; 358/1.14; 358/1.13; 358/1.18; 709/227; 709/203; 709/217

(58) Field of Classification Search ............... 709/227, 709/203, 217; 358/1.15, 1.13, 1.18; 370/338, 370/328; 715/735
See application file for complete search history.

(56) References Cited

U.S. PATENT DOCUMENTS

| | | | |
|---|---|---|---|
| 6,922,725 B2 * | 7/2005 | Lamming et al. | 709/227 |
| 7,124,367 B2 * | 10/2006 | Anderson et al. | 715/735 |
| 7,212,297 B2 * | 5/2007 | Liang et al. | 358/1.13 |
| 2003/0078965 A1 * | 4/2003 | Cocotis et al. | 709/203 |
| 2004/0190042 A1 * | 9/2004 | Ferlitsch et al. | 358/1.15 |
| 2005/0243777 A1 * | 11/2005 | Fong | 370/338 |

* cited by examiner

*Primary Examiner*—Edward L Coles
*Assistant Examiner*—Satwant K Singh

(57) ABSTRACT

In an embodiment of the invention, a method for providing a visitor safe wireless printer access point, includes: connecting a wireless computing device to a wireless network, where the wireless network provides an access point to a print spooling device; determining available printers in a secure wired network; selecting one of the available printers for printing; establishing a print path through the spooling device to the selected printer; sending a print job via the wireless network to the spooling device; spooling the print job on the spooling device; and sending the print job via the secure wired network to the selected printer.

31 Claims, 2 Drawing Sheets

VISITOR SAFE WIRELESS PRINTER ACCESS POINT

TECHNICAL FIELD

Embodiments of the present invention relate generally to network printing technology, and more particularly to a visitor safe wireless printer access point.

BACKGROUND

The issue of permitting easy access to network printers for wireless device users, while maintaining internal network security, is a difficult one to solve. Additionally, many network administrators may not even be aware that the technology exists for creating a public print environment within a secure network.

Currently, a network administrator would have to perform the following steps to set up a public network printing environment for users of wireless devices: (1) setup a wireless access point for public access; (2) setup a firewall between the access point and the secure network, in order to limit the access of the wireless device users to just the printers and/or print servers; and (3) setup a print server on the public network to serve up the appropriate software/drivers for the available printers.

Currently, the wireless device users would have to perform the following steps to print: (1) determine how the wireless user can connect to the wireless network (this step usually involves obtaining the appropriate encryption key and network identification (ID), as well as giving the wireless device user access to more devices in addition to just the printers); (2) switch their current wireless devices to use the wireless network; (3) browse the wireless network to find the available printers, by using the wireless device's current add printer technology; (4) add the available printer; and (5) perform printing by use of the added printer.

It is difficult to create a public network printing environment for the wireless device users, in a secure network. Additionally, there is the complex process of setting up a device for printing in a new network. Furthermore, there are major security issues when allowing the wireless device users to print in a secure environment. It is important that the wireless device users are not able to access particular devices in which the users have no authorization to access.

Therefore, the current technology is limited in its capabilities and suffers from at least the above constraints or deficiencies.

SUMMARY OF EMBODIMENTS OF THE INVENTION

In one embodiment of the invention, a method for providing a visitor safe wireless printer access point, includes: connecting a wireless computing device to a wireless network; checking a packet from the wireless computing device in order to determine if the wireless computing device is attempting to connect to an available printer in a secure wired network; downloading a printer driver and printer driver information to the wireless computing device, and initializing the printer driver; using the wireless computing device to print via the available printer in the secure wired network; and transmitting the print job, split into network packets, to a spooling device, if the packets are allowed packets.

The packets are checked by a printer access point device (wireless access point). The wireless security settings are checked to determine if the packets are permitted to be transmitted to the spooling device.

In another embodiment, apparatus for providing a visitor safe wireless printer access point, includes: a wireless computing device configured to connect to a wireless network with a printer access point device; a spooling device configured to download a printer driver and a printer driver information to the wireless computing device; and wherein the spooling device is configured to check a packet from the wireless computing device in order to determine if the wireless computing device is attempting to connect to an available printer in a secure wired network, and to transmit the packet to the spooling device if the packet is an allowed packet, so that the wireless computing device can be used to print via the available printer in the secure wired network.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

An embodiment of the invention simplifies and condenses the necessary tasks to create a secure, public network printing environment for wireless device users (i.e., mobile users). Embodiments of the invention advantageously allow access to the current installed base of printers on a network, without allowing the mobile user to access the entire network. By use of print spooler technology (network printer technology), wireless access point technology, and firewall technology in a novel and unique manner, an embodiment of the invention provides a wireless printer access point device that permits a mobile user(s) to connect to a wireless network and print to a particular printer(s) in a secure wired network, while not permitting the mobile user to access other devices in the secure wired network. The mobile user can easily connect to the wireless network and is directed to the print spooling device. The print spooling device will then serve the printers that can be used for printing by the mobile user.

Additionally, embodiments of the invention permit the wireless device user to print from printers in the secure wired network, while advantageously not requiring any changes to the secure wired network.

An embodiment of the invention packages many of the necessary hardware elements for a visitor safe wireless printer access point into one device, and configures the device to make the creation of a public network printing environment for mobile users in a much easier manner. An embodiment of the invention also addresses the major security issues when allowing the mobile users to print in a secure environment and provides a service that eliminates the complex process of setting up a device for printing in a new network.

Figure 1:
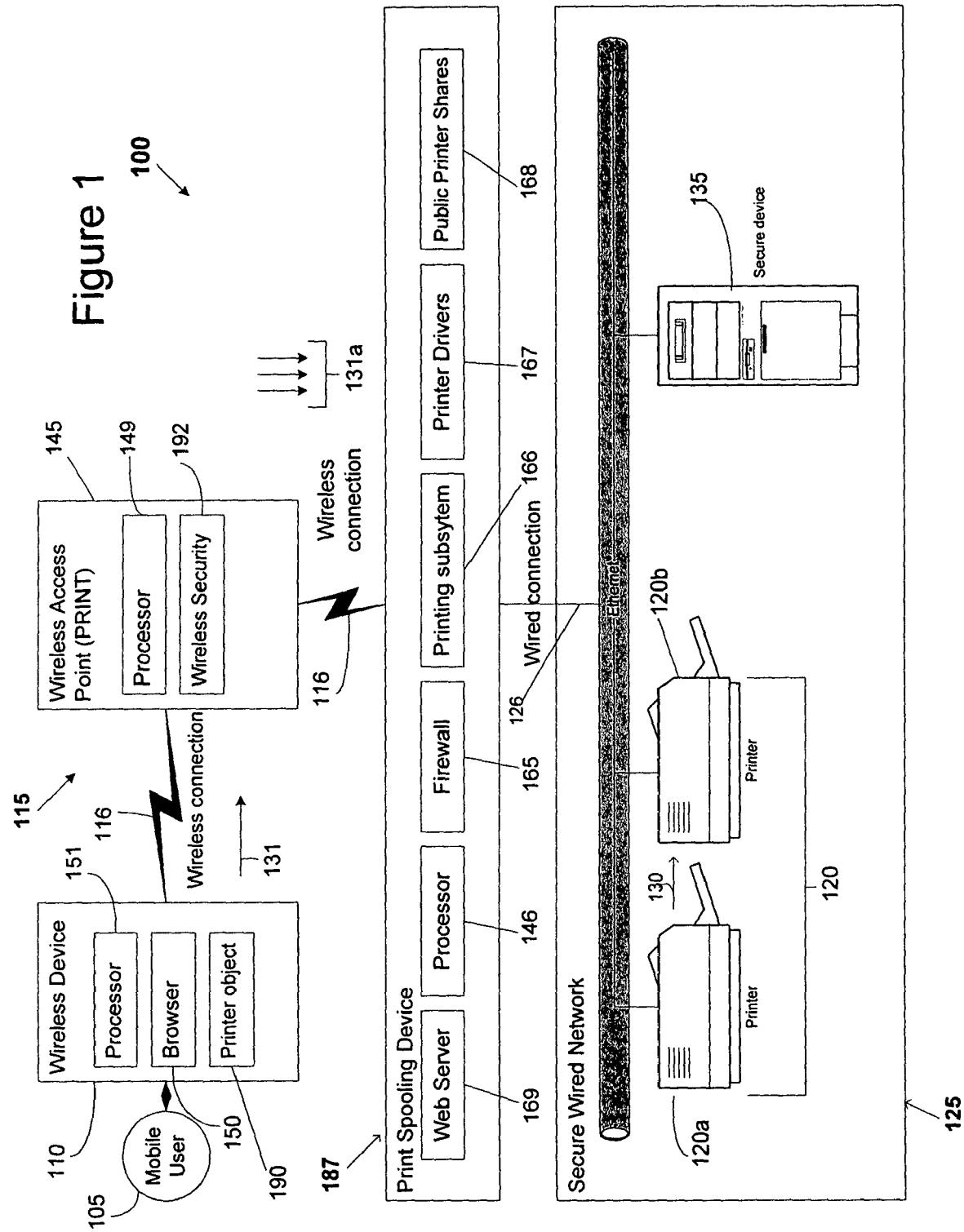
FIG. 1 is a block diagram of an apparatus (system) in accordance with an embodiment of the invention.

FIG. 1 is a block diagram of a network system (apparatus) 100 that can implement an embodiment of the invention. In the example network system 100, a mobile user 105 can use a wireless device 110 to access a wireless network 115 and print from one or more printers 120 that are included in a secure wire network 125. As an example, the secure wire network 125 is based upon the Ethernet specification. In the example of FIG. 1, the printers are generally referred to as printer(s) 120. The printer 120a and printer 120b are examples of particular printers that are included in the secure wire network 125. The number of printers 120 in the secure wired network 125 may vary. The mobile user 105 is typically not authorized to use other devices (such as secure device 135) in the secured wired network 125.

The wireless device 110 is a suitable computing device such as, for example, a laptop, notebook computer, palmtop, or other type of suitable portable computer with wireless operation capability. One suitable wireless protocol for the wireless device 110 is, for example, the IEEE 802.11b standard.

A printer 120 may be a printing device for generating a printed output 130 from a print job. Alternatively, a printer 120 may be other types of devices, such as a copy machine, fax machine, or digital projector that can generate a printed output 130 from a print job.

The secured wired network 125 may also support other devices that have restriction on access. For example, the secured wired network 125 supports a secure computer 135 (and/or other secure device) that is not accessible by the mobile user 105 without authorization.

Various known components and modules that permit the printer 120 or/and other devices to interface in the secure wired network 125 are not shown in FIG. 1 for purposes of describing a functionality of embodiments of the invention. Additionally, various known components and modules that permit the wireless computing device 110 to interface with the wireless network 115 are not shown in FIG. 1 for purposes of describing a functionality of embodiments of the invention.

Assume that the mobile user 105 intends to access one or more of the printers 120 in the secure wired network 125, in order to perform a print operation. The mobile user 105 will first permit the connection of the wireless device 110 to the wireless network 115 by use of a suitable protocol such as the IEEE 802.11b standard. It is understood that the wireless device 110 includes standard hardware and software for permitting communication via the wireless network 115. Typically, the mobile user 105 will configure the wireless settings of the wireless device 110 to match the visitor settings of the wireless network 115, in order to access the wireless network 115.

The PRINT network may be broadly defined as including the spooler device 187 and printer access point device 145. The PRINT network is a public wireless network 115 in the example of FIG. 1. The wireless computing device 110 can connect to the public wireless network 115. The public wireless network 115 may be, for example, a public 802.11b network. As one example, PRINT is the SSID setting that is necessary to communicate on the public 802.11b wireless network where encryption is not enabled. However, it is within the scope of embodiments of the invention that other settings (e.g., the string "MYPRINTERS" or other settings) may be used to communicate on a public 802.11b wireless network. Additionally, it is within the scope of embodiments of the invention that the public wireless network 115 may be implemented by use of other suitable types of networking technologies and that the public wireless network 115 is not limited to the IEEE 802.11b standard. Therefore, other settings are typically used to connect to these public wireless networks 115 that implement other networking technologies.

By connecting to the PRINT wireless network, a user 105 can locate available printers 120, automatically create a way to print to an available printer 120, and then print a job 131 to the printer 120. The actual printer 120 may reside only on the secure wired network 125, and the spooling device 187 may accept a print job 131, spool the job 131, and then print the job 131 to the printer 120 on the wired network 125.

The print job 131 is transmitted from the wireless device 110 to the printer access point device (wireless access point) 145. The print job 130 is split into network packets 131a and transmitted to the print spooling device 187, if the packets 131a are allowed packets. The packets 131a are checked by the printer access point device (wireless access point) 145, prior to the transmission of allowed packets 131a to the print spooling device 187. The standards based wireless security settings 192 are checked by a processor 149 to determine if the packets 131a are permitted to be transmitted to the spooling device 187. Therefore, the wireless access point 145 provides a public access point that allows access to the wireless network 115 where only the print spooling device 187 would be available.

The print spooling device 187 has a wireless connection 116 to the wireless network 115 and a wired connection 126 to the secure wired network 125. The print spooling device 187 is a gateway to the secure wired network 125.

The print spooling device 187 also includes a firewall module 165 that performs all firewall activities, as described in additional detail below, so that allowed print job packets 131a are sent to the appropriate printer 120 on the secure wired network 125.

The spooling device 187 also includes a printing subsystem 166 that performs the printer setup, print job spooling, downloads of printer drivers 167, and other functions to permit printing operations. The printing subsystem 166 may be, for example, a WINDOWS® print subsystem, a LINUX print subsystem, or other types of printing subsystems.

The public print shares 168 establish a print path through the spooling device 187 to the secure wired network printer 120.

The processor 146 in the print spooling device 187 processes the network packets 131a for transmission to a destination printer 120. The processor 146 can also execute the software programs in the print spooling device 187.

The printer access point device 145 is configured to allow wireless access to only the spooler device 187, which may be contained within the access point, within a given secure network environment 125. To accomplish this functionality, the printer access point device 145 is typically set up to allow public access without encryption to the PRINT network. The printer access point device 145 allows access to only the spooler device 187 which by omission it prevents the mobile user 105 to access other devices (e.g., secure computer 135) in the secure wired network 125.

The printer access point device 145 implements current wireless access point technology that permits the mobile user 105 to access the PRINT network. In an embodiment, the printer access point device 145 may include a standard access point module (in hardware or/and software) that acts as a communication hub for mobile users 105 of wireless devices 110 to connect to the PRINT wireless network that will allow indirect access to the printers 120 in the secure wired network 125.

Upon connection of the wireless device 110 to the PRINT network, a browser software 150 in the wireless device 110 is directed to a print web page that is served by the web server 169. The browser software 150 is typically an HTML (hypertext markup language) browser. The processor 151 in the wireless device 110 can execute the browser 150 and execute other software or firmware in the wireless device 110. The web server 169 in the spooler device 187 may typically serve the print web page to the browser 150. The mobile user 105 is then presented with the print web page on a screen of the wireless device 110, where the print web page lists or shows all available printers 120 in the PRINT network. The mobile user 105 could then select one of the available printers 120 in the print web page for printing.

As mentioned above, the printer access point device 145 allows access to the print spooler device 187. The print spooler device 187 also includes the standard firewall 165 that will disallow direct access by the wireless device 110 to any part of the secure wired network 125. The print spooler device 187, which includes the firewall 165, would capture all packets sent from the wireless device 110 via the wireless network 115, and then the print spooler device 187 will spool and send the allowed print job packets 131a to the appropriate printer 120 on the secure wired network 125. The firewall 165 is typically a code or a set of related programs that protect the resources of the secure wired network 125 from unauthorized users. As known to those skilled in the art, a firewall examines each network packet to determine whether to forward the packet toward its destination.

When the wireless device 110 connects with the printer access point device 145, the wireless device 110 will transmit packets (from a print job 131) that are received by the printer access point device 145. The wireless access point device will relay the packets to the spooler device 187, which contains the firewall 165. The firewall 165 will examine the destination address (DA) of the packets to determine if the wireless device 110 is attempting to connect to a printer 120 that is permitted to be accessed by the mobile user 105, or if the wireless device 110 is attempting to connect to a restricted resource (e.g., secure device 135 in secure network 125) that is not permitted to be accessed by the mobile user 105. If the firewall 165 determines that the destination address of the packets is to one of the printers 120a or 120b (or to other available printers 120, then the firewall 165 will allow the spooling device 187 to spool the packets as part of the print job being sent by the wireless device 110. Once the spooling device 187 receives all print job packets for a single print job 131, it will send the print job to the appropriate printer 120.

On the other hand, if the firewall 165 determines that the destination address of the packets is to a restricted resource in the secure wired network 125 (such as secure device 135), then the firewall 165 will prevent the packets from transmitting to the destination address, and may be optionally configured to return to the wireless device 110 a message indicating, for example, that the requested access to the resource in the destination address has been denied.

In another embodiment, a mobile user 105 can connect directly to a printer access point device 145 that uses a wireless security module 192. The wireless security module 192 is responsible for all standards based wireless security settings. Once the user has connected to the wireless PRINT network through the access point device 145 and has been authenticated and/or encryption methodology has been negotiated, the mobile user 105 can be directed to the print spooling device 187, by launching a browser 150 or other suitable software in the mobile wireless device 110. The available printers 120 are then shown in the screen of the wireless device 110, after connection to the print spooling device 187.

After the mobile user 105 initially selects one of the available printers 120, the printer driver information and the printer driver 167 for the initially selected available printer 120 will be downloaded to the wireless device 110 via the wireless network 115, and a print path is then created from the mobile wireless device 110 to a spooling device 187, and indirectly to the selected wired printer 120. This step is applicable to all embodiments of the invention.

The printer driver information of the downloaded printer driver 167 is needed in order to install the downloaded printer driver 167 locally to the wireless device 110. The printer driver information typically includes multiple files that are required for use of the printer driver 167, including a file with the main entry point that is supported by the printer driver 167, the name of the printer driver, the version of the operating system for use with the printer driver, and other specific information about the printer driver 167.

Typically, the spooling device 187 is a server with a standard spooler/scheduler that receives print jobs from other computers and generates printer files that are transmitted to one of the printing devices 120 that can appropriately handle the print job. Therefore, the spooler/scheduler provides the printing capability by the mobile device 110 to the available printers 120. The processor 146 in the spooling device 187 can execute the standard spooler/scheduler and other software or firmware in the spooler device 187.

The spooling device 187 also typically downloads the printer driver information and the printer driver 167 to the wireless device 110. The wireless device 110 then creates a printer object 190 after the downloaded driver 167 has been initialized, and the selected printer 120 will then be available for printing. The local printer object 190 uses (and represents) the physical printer device 120. The local printer object 190 is data with various settings that describe the physical printer device 120. In other words, the data associated with the initialization of the printer driver 167 is stored into the local printer object 190.

Various known print installation methods (e.g., point and print) may be supported by the spooling device 187 for vending out the drivers 167, after the mobile user 105 has selected an available printer 120 for printing.

Various examples are available on how a mobile user 105 can select an available printer 120 for printing. For example, the mobile user 105 can select an available printer 120 based upon any description that is provided in the print web page for the available printers 120. As another example, the mobile user 105 can select a convenient printer 120 (e.g., a printer that is physically in the proximity of the mobile user 105). The mobile user 105 will select a printer name in the list of available printers 120, as indicated in the print page.

As another example, assume that a mobile user 105 has connected to the wireless network 115 and has loaded a device discovery software that is attempting to discover available printers 120 in the secure wired network 125. In this embodiment, the utility application 150 in the wireless device 110 is a network printer application 150 instead of a browser 150, where the network printer application 150 will discover printer devices. Of course, the wireless device 110 could include both a browser and a network printer application for discovering the printer devices. A suitable device discovery software 150 is available from, for example, HEWLETT-PACKARD COMPANY. Device discovery can be performed by sending out a broadcast request or multicast request on a network. The print spooler device 187 can reply back with a list of printers 120 that are available to the mobile user 105. The device discovery software 150 can also set up print paths to the available printers 120.

It should be appreciated that, in alternative embodiments, the network system 100 may include components and products other than those discussed above. Moreover, the network system 100 can be implemented on different hardware. Printers having printing capabilities different from the disclosed physical printer devices may be used. Those skilled in the art will recognize that other alternative hardware and software environments may be used without departing from the scope of embodiments of the invention. As such, the exemplary environment in FIG. 1 is not intended to limit embodiments of the invention.

Figure 2:
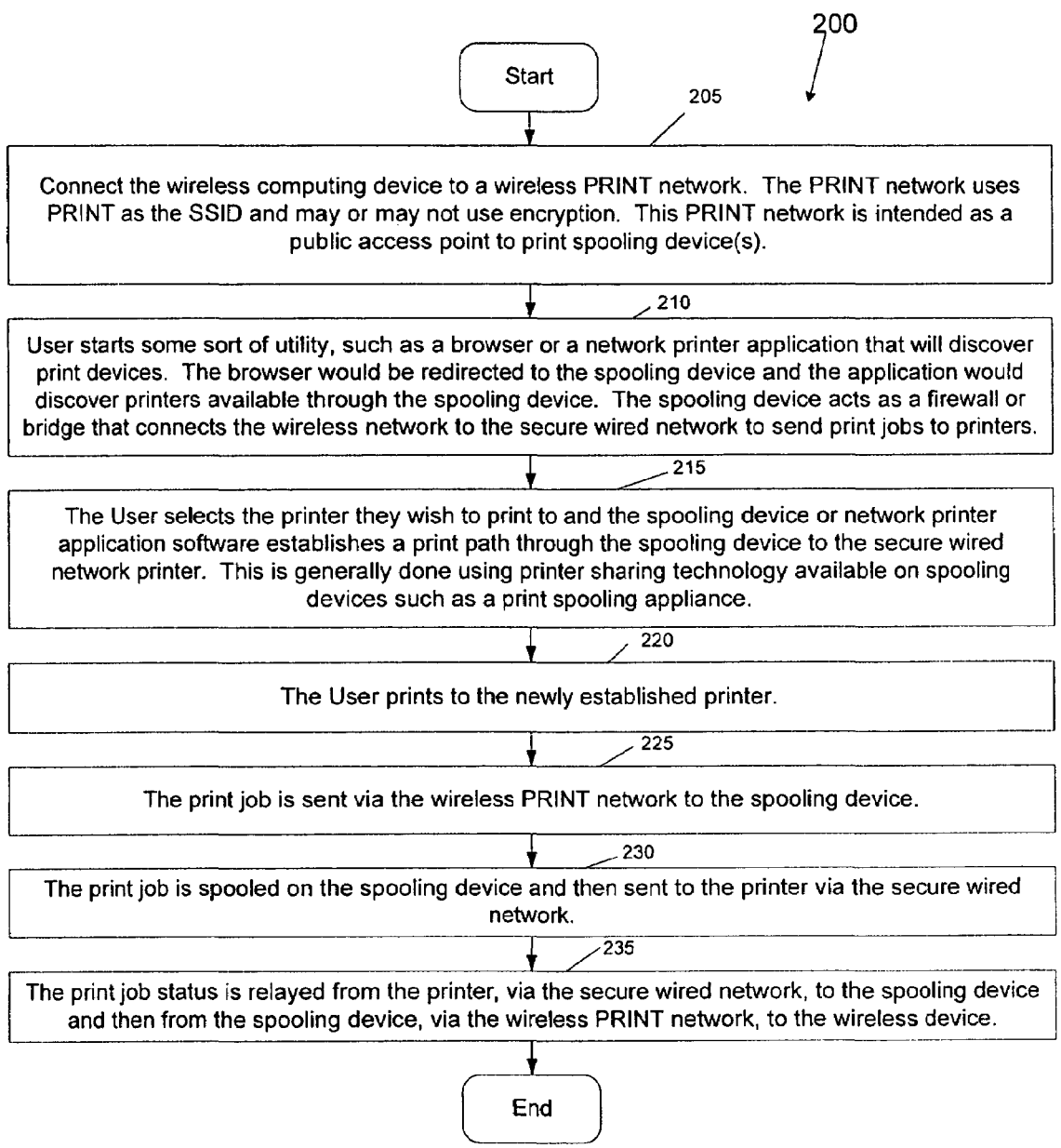
FIG. 2 is a flowchart of a method for a visitor safe wireless printer access point, in accordance with an embodiment of the invention.

FIG. 2 is a flowchart of a method 200 for a visitor safe wireless printer access point, in accordance with an embodiment of the invention. A mobile user 105 will first connect (205) a wireless computing device 110 to a wireless network (e.g., wireless PRINT network) 115, in order to access and print to a printer 120. The PRINT network 115 uses PRINT as the SSID (service set identifier) setting and may or may not use encryption. PRINT is an example of publicly available settings that are necessary for communication on the wireless PRINT network. The PRINT network is intended as a public access point to print spooling device(s). As mentioned above, it is within the scope of embodiments of the invention that the public wireless network 115 may be implemented by use of other suitable types of networking technologies and is not limited to the wireless PRINT network.

In step (210), the mobile user will start a type of utility application 150, such as a browser or a network printer application that will discover print devices 120. The browser would be redirected to the spooling device 187 and the network printer application would discover the available printers through the spooling device. The spooling device acts as a firewall or bridge that connects the wireless network 115 to the secure wired network 125 to send print jobs to printers.

In step (215), the mobile user selects the printer that he/she wishes to print to and the spooling device or network printer application software establishes a print path through the spooling device to the secure wired network printer 120. This is generally done by using printer sharing technology that is available on spooling devices such as, for example, a print spooling appliance available from HEWLETT-PACKARD COMPANY or other suitable spooling devices.

In step (220), the mobile user prints to the newly established printer.

In step (225), the print job is sent via the wireless PRINT network to the spooling device.

In step (230), the print job is spooled on the spooling device and then sent to the printer via the secure wired network 125.

In step (235), as an option, the print job status is relayed from the printer, via the secure wired network, to the spooling device and then from the spooling device, via the wireless PRINT network, to the wireless device.

Thus, an embodiment of the invention simplifies the task of permitting a printer (or printers) to be publicly available to users of wireless devices, in a secure network environment. An embodiment of the invention, when connected to a wired or wireless network, would give the mobile users the ability to connect to a network and easily perform printing, while disallowing access by the mobile users to the secure resources of the network. In addition, an embodiment of the invention provides a service to the mobile users that presents them a list of the available printers upon connection to the wireless network, and then configures the mobile wireless device to print to the available printer that is selected by the mobile wireless device user.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A method for providing a visitor safe wireless printer access point, the method comprising:
   connecting a wireless computing device to a wireless network, where the wireless network provides a public access point to a print spooling device;
   determining all available printers in a secure wired network, wherein the wireless computing device is permitted to access the available printer in the secure wired network and is prevented from accessing a secure device in the secure wired network;
   selecting one of available printers for printing;
   establishing a print path through the spooling device to the selected printer;
   sending a print job via the wireless network to the spooling device;
   spooling the print job on the spooling device; and
   sending the print job via the secure wired network to a selected printer from the available printers.

2. The method of claim 1, wherein the print job is split into network packets and transmitted to the spooling device, if the packets are allowed packets.

3. The method of claim 2, wherein the packets are checked by the public access point device.

4. The method of claim 2, further comprising:
   in response to receipt of an allowed packet by the spooling device, launching a print web page that shows at least one available printer in the secure wired network.

5. The method of claim 2, further comprising:
   if any one of the packets is not an allowed packet, then preventing the mobile wireless device from accessing a secure device in the secured wired network.

6. The method of claim 1, wherein the action of determining all available printers in a secure wired network comprises:
   starting a utility application in the wireless device, where the utility application comprises a browser that is directed to the spooling device.

7. The method of claim 1, wherein the action of determining all available printers in a secure wired network comprises:
   starting a utility application in the wireless device, where the utility application comprises a network printer application that is configured to discover the available printers through the spooling device.

8. The method of claim 1, further comprising:
   downloading a printer driver from the spooling device to the wireless device; and
   initiating the printer driver in the wireless device.

9. The method of claim 1, further comprising:
   relaying a print job status from the printer, via the secure wired network, to the spooling device; and
   relaying the print job status from the spooling device, via the wireless network, to the wireless device.

10. The method of claim 1, wherein the wireless network is a wireless PRINT network.

11. The method of claim 10, wherein the wireless PRINT network is a public access point to at least one print spooling device.

12. The method of claim 1, wherein the spooling device is configured to act as a bridge to send print jobs from the wireless device to the selected printer.

13. The method of claim 1, wherein the spooling device is configured to act as a firewall to prevent access to a secure device in the secured wired network.

14. An apparatus for providing a visitor safe wireless printer access point, the apparatus comprising:
   means connecting a wireless computing device to a wireless network by use of a printer access point device;
   means for transmitting the packet to a spooling device, if the packet is an allowed packet;
   means for downloading a printer driver and a printer driver information to the wireless computing device, and initializing the printer driver; and
   means for using the wireless computing device to print via an available printer in a secure wired network if the wireless computing device is permitted to access the available printer in the secure wired network, and to prevent the wireless computing device from accessing a secure device in the secure wired network.

15. An apparatus for permitting print operations from a network printer in a secure wired network, the apparatus comprising:
   a wireless computing device configured to connect to a wireless network, the wireless network including a public access point;
   a print spooling device that is accessed from the public access point;
   wherein a print job is sent from the wireless computing device via the wireless network to the spooling device;
   wherein the wireless computing device is permitted to access at least one available printer in a secure wired network and is prevented from accessing a secure device in the secure wired network; and
   wherein the print job is spooled on the spooling device and the print job is sent via a secure wired network to a selected printer that is selected from the at least one available printer.

16. The apparatus of claim 15, wherein the print job is split into network packets and transmitted to the spooling device, if the packets are allowed packets.

17. The apparatus of claim 16, wherein the packets are checked by the public access point.

18. The apparatus of claim 16, wherein the spooling device is configured to launch a print web page that shows at least one available printer in the secure wired network, in response to receipt of an allowed packet by the spooling device.

19. The apparatus of claim 16, wherein the mobile wireless device is prevented from accessing a secure device in the secured wired network, if any one of the packets is not an allowed packet.

20. The apparatus of claim 15, wherein the mobile wireless device is configured to start a utility application, where the utility application comprises a browser that is directed to the spooling device.

21. The apparatus of claim 15, wherein the mobile wireless device is configured to start a utility application, where the utility application comprises a network printer application that is configured to discover the available printers through the spooling device.

22. The apparatus of claim 15, wherein the spooling device is configured to download a printer driver to the wireless device, and wherein the printer driver is initiated in the wireless device.

23. The apparatus of claim 15, wherein a status of the print job is relayed from the printer, via the secure wired network, to the spooling device; and wherein the status of the print job is also relayed from the spooling device, via the wireless network, to the wireless device.

24. The apparatus of claim 15, wherein the wireless network is a wireless PRINT network.

25. The apparatus of claim 15, wherein the spooling device is configured to act as a bridge to send print jobs from the wireless device to the selected printer.

26. The apparatus of claim 15, wherein the spooling device is configured to act as a firewall to prevent access to a secure device in the secured wired network.

27. An apparatus for providing a visitor safe wireless printer access point, the apparatus comprising:
- a wireless computing device configured to connect to a wireless network with a printer access point device;
- a spooling device configured to download a printer driver and a printer driver information to the wireless computing device; and
- wherein the spooling device is configured to check a packet from the wireless computing device in order to determine if the wireless computing device is attempting to connect to an available printer in a secure wired network, and to transmit the packet to the spooling device if the packet is an allowed packet, so that the wireless computing device can be used to print via the available printer in the secure wired network if the wireless computing device is permitted to access the available printer in the secure wired network, and wherein the wireless computing device is prevented from accessing a secure device in the secure wired network.

28. The apparatus of claim 27, wherein the printer access point device is configured to check standard wireless security settings.

29. The apparatus of claim 27, wherein the spooler device is configured to launch a print web page that shows at least one available printer in the secure wired network, in response to receipt of an allowed packet.

30. The apparatus of claim 27, wherein the printer access point device prevents the mobile wireless device from accessing a secured device in the secured wired network, if the wireless security settings are not correct.

31. An article of manufacture, comprising:
- a computer-readable medium having stored thereon instructions to:
  - connect a wireless computing device to a wireless network, where the wireless network provides a public access point to a print spooling device;
  - determine all available printers in a secure wired network, wherein the wireless computing device is permitted to access the available printers in the secure wired network and is prevented from accessing a secure device in the secure wired network;
  - select one of available printers for printing;
  - establish a print path through the spooling device to the selected printer;
  - send a print job via the wireless network to the spooling device, where the print job is spooled in a spooling device and sent via the secured wired network to a selected printer from the available printers.

* * * * *